United States Patent [19]
Wako et al.

[11] Patent Number: 5,085,151
[45] Date of Patent: Feb. 4, 1992

[54] BOGIE FRAME FOR RAILWAY VEHICLE AND METHOD THEREOF

[75] Inventors: Kanji Wako, Tokyo; Tetsujiro Fukui; Yusuke Tanaka, both of Utsunomiya, all of Japan

[73] Assignees: Fuji Jukogyo Kabushiki Kaisha; Railway Technical Research Institute, both of Tokyo, Japan

[21] Appl. No.: 648,174

[22] Filed: Feb. 1, 1991

[30] Foreign Application Priority Data

Feb. 5, 1990 [JP] Japan .................................. 2-25514

[51] Int. Cl.⁵ .................................................. B61F 5/00
[52] U.S. Cl. .................................. 105/206.1; 105/182.1
[58] Field of Search ................. 105/200, 206.1, 226, 105/227, 182.1, 157.1; 52/727, 729, 731, 806, 800, 795

[56] References Cited

U.S. PATENT DOCUMENTS

| | | | |
|---|---|---|---|
| 2,545,956 | 3/1951 | Julien | 105/182.1 |
| 3,826,202 | 7/1974 | Russel | 105/182.1 |
| 4,394,529 | 7/1983 | Gounder | 52/731 |

FOREIGN PATENT DOCUMENTS 0345709 12/1989 European Pat. Off. ......... 105/182.1

*Primary Examiner*—Robert J. Oberleitner
*Assistant Examiner*—Mark T. Le
*Attorney, Agent, or Firm*—Beveridge, DeGrandi & Weilacher

[57] ABSTRACT

A bogie frame for a railway vehicle has a pair of side beams made of fiber reinforced plastic material with a box-shaped cross section. A pair of cylindrical horizontal beams span between the paired side beams are formed of a fiber reinforced plastic material. A honeycomb core is filled up in an inner hollow portion of each of the side beams. A reinforcing member is further filled up in the honeycomb core. The coupling comprises a taper pad mounted to end portions of the horizontal beam and the taper sleeve. The taper pad is provided with tapering portions at its ends downwardly tapering from a central portion. The taper sleeve is fitted into a gap between an outer periphery of the tapering portion of the taper pad and an inner periphery of the hole of the side beam.

8 Claims, 3 Drawing Sheets

BOGIE FRAME FOR RAILWAY VEHICLE AND METHOD THEREOF

BACKGROUND OF THE INVENTION

The present invention relates to a bogie frame for a railway vehicle, and in particular a bogie frame for a railway vehicle and provided with side and horizontal beams constituting the bogie frame formed of fiber reinforced plastics to reduce the entire weight of the bogie frame of the railway vehicle.

Usually, the bogie frame of a railway vehicle or a rolling stock is mainly of steel plates, but recently, bogie frames are manufactured by utilizing fiber reinforced plastic material (called hereinlater "FRP") to reduce the total weight thereof such as disclosed in Japanese Patent Laid-Open Publication No. 90771/1981 or No. 143257/1986.

The former publication (90771/1981) discloses a bogie frame for a railway vehicle, in which the bogie frame is integrally constructed by an H-shaped member made from FRP and an axle of the bogie is elastically supported by utilizing the elasticity of the H-shaped member itself without using a specific axle supporting member such as a leaf spring for the purpose of reducing the whole weight of the bogie frame.

The later publication (143257/1986) also discloses a bogie frame for a railway vehicle, in which the bogie frame is made from FRP so that a flexural rigidity thereof corresponds to that of a spring constant of an axle spring formed of ordinary materials.

In a case where the bogie frame for the railway vehicle is manufactured by utilizing FRP, it is required to harmonize the two contradicting factors of maintaining the strength of the bogie frame and reducing the weight thereof in addition to cost problem. Namely, with respect to the strength of the bogie frame, it is necessary to have sufficient strength against the concentration of stress applied to joined portions between horizontal beams and side beams constituting the bogie frame. A solution to this problem has been proposed in Japanese Patent Laid-Open Publication No. 139567/1985 or No. 46971/1988, for example.

However, the integral manufacture of the bogie frame by utilizing the FRP and the location of an additional rib to obtain sufficient strength against the concentration of the stress applied to the joined portion between the side and horizontal beams results in an increase of the manufacturing cost for the bogie frame of the railway vehicle. In another aspect, it was difficult to obtain sufficient strength by forming the horizontal and side beams individually with FRP and by joining them together afterwards.

SUMMARY OF THE INVENTION

An object of the present invention is to substantially eliminate defects or drawbacks encountered in the prior art described above and to provide a bogie frame particularly for a railway vehicle having an increased strength of a joined portion of side and horizontal beams constituting the bogie frame individually formed of a fiber reinforced plastic material at low manufacturing cost.

This and other objects can be achieved according to the present invention by providing a bogie frame for a railway vehicle comprising a pair of side beams each formed of elongated plate members of a fiber reinforced plastic material so as to have substantially a box-shaped cross section, at least one horizontal beam stretched between the paired side beams and formed of a fiber reinforced plastic material so as to have a cylindrical structure which has a honeycomb core filled an inner hollow portion of each of the side beams, wherein the side beams have opposing side portions at which coupling holes are formed and the horizontal beam has end portions which are inserted into the holes of the side beams through coupling means and a bonding agent.

In the preferred embodiment, a reinforcing member is filled up in space of the honeycomb core at the central portions of the side beams. The coupling means comprises a taper pad mounted on end portions of the horizontal beam, the taper pad being provided with tapering portions downwardly tapering from a central portion thereof, the tapering portions being engaged with the hole of the side beam where the side and horizontal beams are coupled, and a taper sleeve to be fitted into a gap between an outer periphery of the tapering portion of the taper pad and an inner periphery of the hole of the side beam.

Generally, two parallel horizontal beams may span between the side beams.

According to the structures of the bogie frame for the railway vehicle described above, the strength of the whole structure of the side beams can be reinforced by the arrangement of the honeycomb core. Packing the reinforcing resin in the honeycomb core can further increase the strength of the side beams by securing a sufficient bonded area between the side and horizontal beams constituting the bogie frame. Both beams are coupled by the coupling members and the bonding agent so that the concentration of stress to the coupled portion can be effectively prevented. Accordingly, since the side and horizontal beams are manufactured individually with the fiber reinforced plastic material, the manufacturing cost can be reduced and the total weight of the bogie frame can be reduced.

A preferred embodiment of the present invention will become understood from the following detailed description referring to the accompanying drawings.

DESCRIPTION OF THE PREFERRED EMBODIMENT

Figure 1:
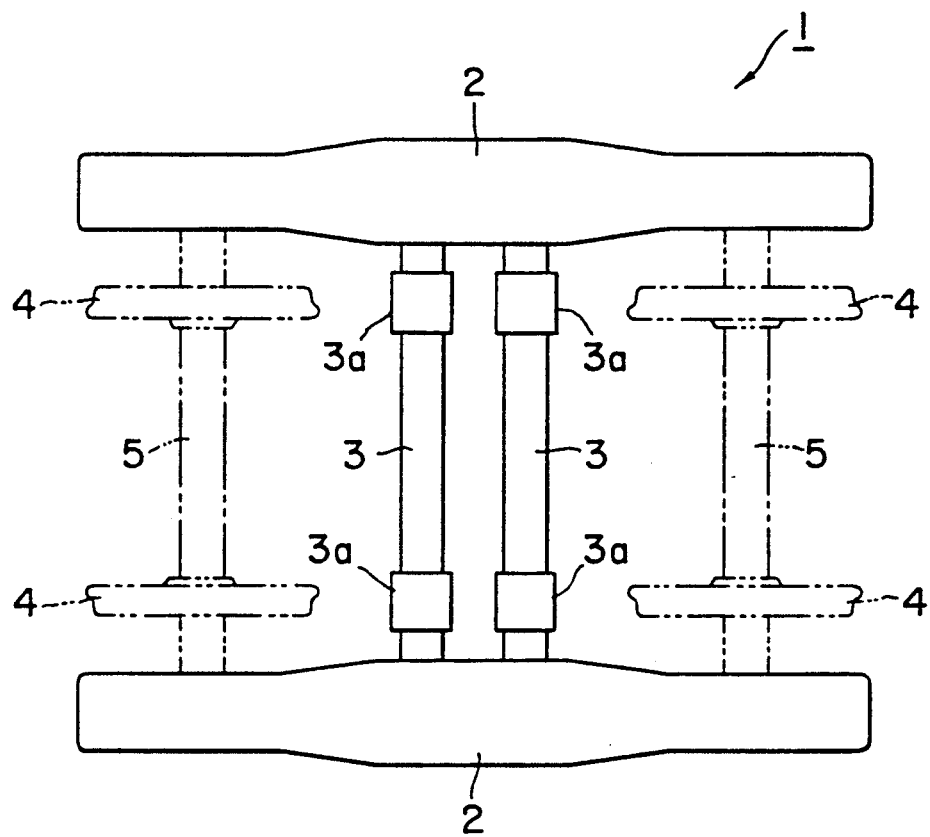
FIG. 1 is a plan view of a bogie frame for a railway vehicle according to the present invention.

Referring to FIG. 1, a bogie frame for a railway vehicle according to the present invention is generally designated by reference numeral 1. The bogie frame 1 comprises side beams 2, 2 disposed on both sides of the railway vehicle in a travelling direction thereof, and horizontal beams 3, 3 having reinforced portions 3a, 3a span between the side beams 2, 2 substantially at the central portion. The side and horizontal beams 2 and 3 are made from fiber reinforced plastic (FRP) material. Axles 5, 5 to which wheels 4, 4 are mounted, are supported by bearing means (not shown) at the front and rear portions of the side beams 2, 2 of the bogie frame 1.

Figure 2:
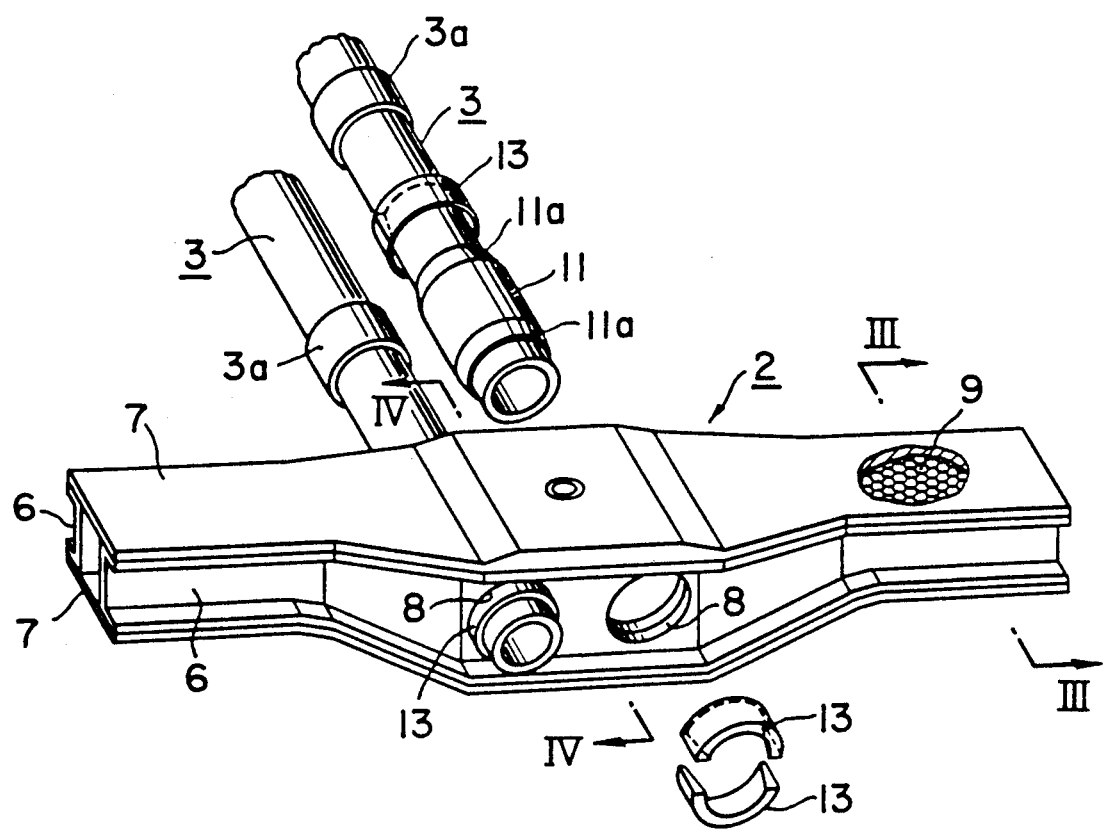
FIG. 2 is a perspective view of joining portions of horizontal and side beams constituting the bogie frame shown in FIG. 1.
Figure 3:
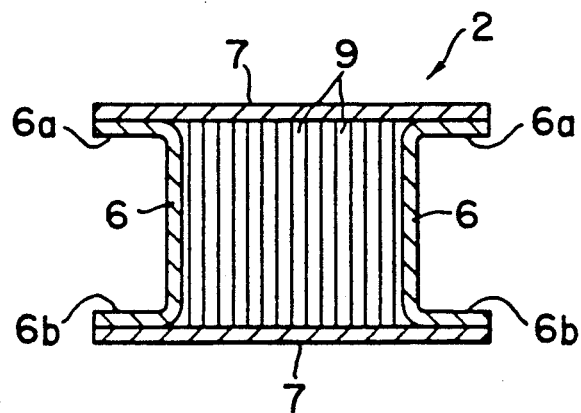
FIG. 3 is a cross sectional view taken along the line III—III shown in FIG. 2.
Figure 4:
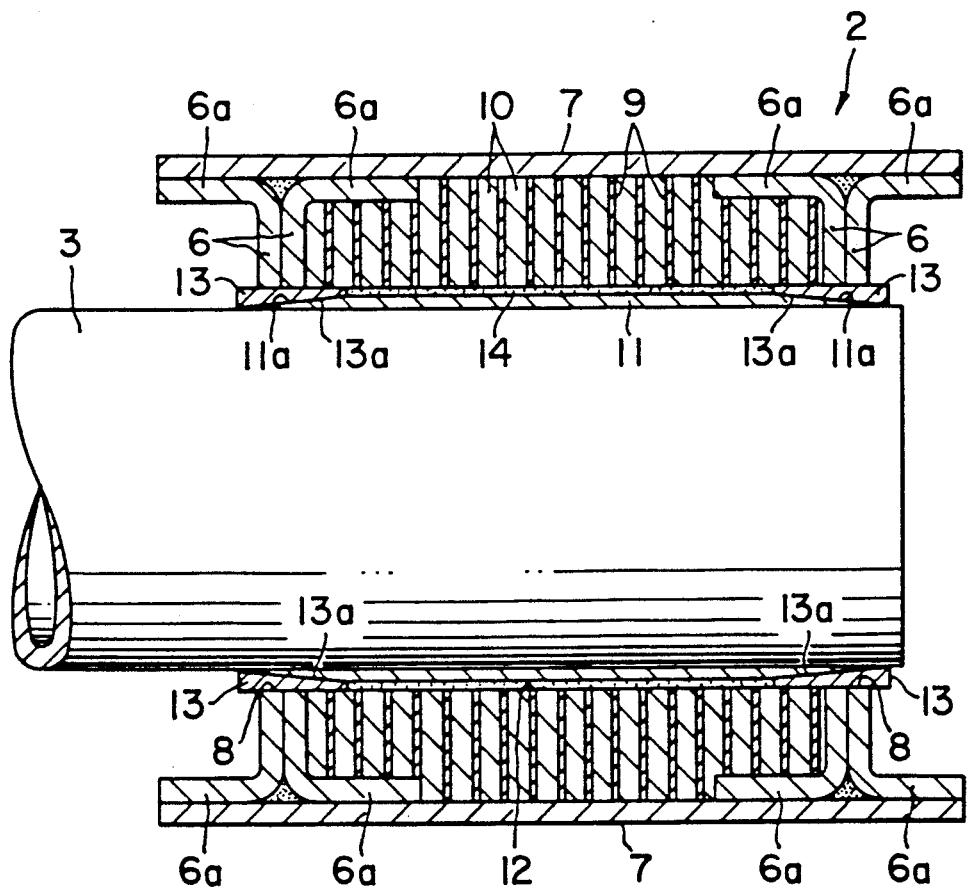
FIG. 4 is also a sectional view taken along the line IV—IV shown in FIG. 2.

As shown in FIGS. 2 to 4, each of the side beams 2 has a box-shaped structure in cross section, assembled with web plates 6, 6 and flat plates 7, 7, each having an elongated plate-like shape made of FRP. Carbon fiber reinforced plastics (CFRP), alamid fiber reinforced plastics (AFRP) or glass fiber reinforced plastics (GFRP) may be utilized for the FRP constituting the web plates 6 and the flat plates 7.

As clearly shown in FIG. 3, each of the web plates 6 has a channel structure and is provided with upper and lower longitudinal edge portions formed as flanged portions 6a and 6b. Two web plates 6, 6 each having the structure described above are opposingly arranged with the flanged portions being directed outward. The flat plates 7, 7 are bonded respectively to the upper and lower flanged portions 6a and 6b by a bonding agent. Each of the side beams 2 has a central portion having a width wider than those of the end portions. The strength of the side beam 2 at the central portion thereof is reinforced by additionally arranging further two web plates 6, 6 in a back-to-back manner with respect to the aforementioned web plates as shown in FIG. 4. Namely, the flanged portions 6a and 6b of the outer web plates 6 are directed outward and the flanged portions 6a and 6b of the inner web plates 6 are directed inward. Holes 8, 8 are formed in the central portion of each of the side beams 2, 2 for coupling the horizontal beams 3, 3 with the side beams 2 and 2.

A honeycomb core 9 is packed in the hollow interior of the side beam 2 as a reinforcing member as shown in FIG. 3 or 4. In addition, a reinforcing resin 10 may be further packed in spaces formed in honeycomb shape of the honeycomb core 9 at portions to which it is desired to add further strength. Particularly, stress is generally concentrated to the central portions of the side beams 2 to which the horizontal beams 3 are coupled, so that it is desired to completely fill the spaces of a honeycomb shape of the core 9 at the central portion of the side beam 2, with the reinforcing resin 10.

Each of the horizontal beams 3 has a cylindrical structure also formed of FRP material. Taper pads 11 are mounted and bonded to the end portions of the horizontal beam 3 for coupling the same with the side beams 2 and 2. The taper pad 11 has a cylindrical structure having an outer periphery tapering downwardly from the central portion thereof so as to exhibit tapering portions 11a and 11a at their ends.

The side and horizontal beams 2 and 3 are coupled in accordance with the following manner.

The end portions of the horizontal beam 3 with the taper pads 11 mounted are inserted into the holes 8 of the web plates 6, 6, constituting the side portions of the side beams 2, 2 and the holes 12 formed to the honeycomb core 9 coaxially with the holes 8. Taper sleeves 13 are inserted into gaps between the tapering portion 11a formed on the taper pads 11 and the holes 8 as joining members. Each of the taper sleeves 13 has a semicylindrical inner peripheral surface to which is formed a tapering portion 13a having a shape corresponding to that of the tapering portion 11a of the taper pad 11. A pair of two taper sleeves 13 are integrally coupled when they are assembled. The outer peripheral surface of the taper pad 11 and the inner peripheral surface of the hole 12 of the honeycomb core 9 are bonded by a thermosetting or cold setting bonding agent 14 having a property that the volume is expanded when both peripheries are hardened. In a case where a thermosetting bonding agent is utilized, the bonding agent is hardened by heating the assembled taper pad 11 and the honeycomb core 9 in an autoclave.

As described above, in the bogie frame 1, the honeycomb core 9 reinforces the strength of the whole structure of the side beam 2 which is composed of the web plates 6, 6 and the flat plates 7, 7 bonded together. Moreover, the honeycomb core 9 itself is reinforced in its strength by the honeycomb shaped partition walls with reduced weight increase.

In another aspect, with respect to the portions such as coupled portion between the side and horizontal beams 2 and 3 to which the stress is concentrated, the strength is reinforced by packing the reinforcing resin material 10 into the hollow portion (honeycomb shape) of the honeycomb core 9. For the reason described above, the sufficient bonded area of the horizontal beam 3 can be realized throughout the whole width direction of the cross sectional area of the corresponding side beam 2 through the reinforcing resin 10, so that a sufficient bonded strength can be achieved by the bonding agent. In addition, the taper pad 11 and the taper sleeve 13 can be brought into tight contacted through the tapering portions 11a and 13a thereof and the bonding agent 14 is filled up in the gap between the outer periphery of the taper pad 11 and the inner periphery of the hole 12 of the honeycomb core 9, whereby substantially no gap exists at the bonded portion, and the concentration of the stress on the specific portion of the bonded portion can be prevented.

In an economic view point, the independently manufactured horizontal beams 3 and the side beams 2 are bonded and assembled into the bogie frame 1 of the railway vehicle, so that the manufacturing cost can be relatively lowered even if relatively expensive FRP is utilized. Namely, the side beam 2 is composed by bonding the web plates 6 and the flat plates 7 having relatively simple structure suitable for the mass production and the horizontal beam 3 is of a generally simple cylindrical structure. Accordingly, the side and horizontal beams 2 and 3 can be formed without using complicated molds and the yielding of the materials can be improved. In addition, any specific jig is not utilized for assembling the side and horizontal beams, thus reducing the various costs for the manufacture of the bogie frame of the railway vehicle.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A bogie frame for a railway vehicle, comprising:
   a pair of side beams each formed of elongated plate members of a fiber reinforced plastic material with a substantially box-shaped cross section;
   at least one cylindrical horizontal beam stretched between the paired side beams and formed of the fiber reinforced plastic material;
   a honeycomb core filled up in an inner hollow portion of each of said side beams; and
   said side beams having opposing side portions with coupling holes, said horizontal beam having end portions being inserted into said holes of said side beams.

2. The bogie frame according to claim 1, wherein each of said side beams has a central portion having a larger width than that of other portions, said holes being formed at central portions of the respective side beams.

3. The bogie frame according to claim 2, wherein a reinforcing member is filled up in spaces of the honeycomb core at said central portions of the side beams.

4. The bogie frame according to claim 1, wherein each of said side beams is composed of a pair of web plates and a pair of flat plates, each of said web plates having a channel structure provided with flanged portions extending along longitudinal upper and lower edges of the web plate and said flat plates being bonded to said upper and lower flanged portions.

5. The bogie frame according to claim 4, wherein a further pair of web plates is disposed in back-to-back manner with respect to the aforementioned web plates at the central portion of each of said side beams.

6. The bogie frame according to claim 1, wherein each of said coupling means comprises a taper pad mounted to an end portion of said horizontal beam, said taper pad being provided with tapering portions at its ends downwardly tapering from a central portion thereof, said tapering portions being engaged with the holes of one of the side beams where said side and horizontal beams are coupled, and a taper sleeve to be fitted into a gap between an outer periphery of one of said tapering portions of the taper pad and an inner periphery of one of said holes of said one of the side beams and wherein a bonding agent is filled in a space about an outer periphery of the central portion of the taper pad.

7. The bogie frame according to claim 1, wherein two parallel horizontal beams are spanned between said side beams.

8. A method for making a bogie frame of a railway vehicle, comprising steps of: forming a pair of side beams with elongated plates from a fiber-reinforced-plastic material;
stretching at least one cylindrical beam between said beams;
filling a honeycomb core in each of said side beams; and
inserting said cylinder beam into holes formed in said side beams.

* * * * *